(12) United States Patent
Kohlen

(10) Patent No.: US 6,772,730 B2
(45) Date of Patent: Aug. 10, 2004

(54) THROTTLE-VALVE ASSEMBLY

(75) Inventor: Peter Kohlen, Neu-Anspach (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/398,365

(22) PCT Filed: Oct. 11, 2001

(86) PCT No.: PCT/DE01/03866
§ 371 (c)(1),
(2), (4) Date: Oct. 7, 2003

(87) PCT Pub. No.: WO02/31387
PCT Pub. Date: Apr. 18, 2002

(65) Prior Publication Data
US 2004/0069967 A1 Apr. 15, 2004

(30) Foreign Application Priority Data
Oct. 12, 2000 (DE) .......................................... 100 50 408

(51) Int. Cl.$^7$ ................................................ F02D 9/08
(52) U.S. Cl. ...................................... 123/337; 123/403
(58) Field of Search ......................... 251/305; 123/337, 123/403

(56) References Cited

U.S. PATENT DOCUMENTS

| | | | |
|---|---|---|---|
| 5,203,539 A | 4/1993 | Stary | |
| 5,615,861 A | 4/1997 | Pollmann et al. | |
| 5,722,366 A | 3/1998 | Adachi et al. | |
| 6,006,722 A | 12/1999 | Hall | |
| 6,047,950 A | * 4/2000 | Pontoppidan et al. | ....... 251/305 |
| 6,186,115 B1 | * 2/2001 | Nishimura et al. | ......... 123/337 |

FOREIGN PATENT DOCUMENTS

| | | |
|---|---|---|
| DE | 4311369 | 10/1993 |
| DE | 4429956 | 2/1996 |
| DE | 19704012 | 8/1998 |
| DE | 19728564 | 1/1999 |
| DE | 19854595 | 6/2000 |

OTHER PUBLICATIONS

Patent Abstracts of Japan, Publication No.: 2000045799, publication date Feb. 15, 2000, Application No.: 10209168, date of filing: Jul. 24, 1998; Yamada Hiroyuki et al, (Hitachi LTD Hitachi Car Eng Co LTD).
JP 07 293712 A (Calsonic Corp) Nov. 10, 1995.

* cited by examiner

Primary Examiner—Paul J. Hirsch
(74) Attorney, Agent, or Firm—Martin A. Farber

(57) ABSTRACT

A throttle-valve assembly (10) having a housing (12), which has a continuous throttle opening (16) through which a gaseous medium (62) can flow in a main flow direction (60), in which a throttle valve (20) fastened pivotably on a throttle-valve shaft (18) is arranged in the throttle opening (16), and the throttle-valve shaft (18) can be pivoted by an actuator (26) arranged in the housing (12), in which, starting from the axis of rotation (19) of the throttle-valve shaft (18) downstream along the main flow direction (60) of the gaseous medium (62), the throttle opening (16) has an approximately straight cylinder section (64) with a height $H_1$ and a radius $R_Z$ and in which a spherical-cap section (68) adjoins the approximately straight cylinder section (64). To reliably ensure a finely graduated control of the gaseous medium (62) passing through the throttle opening (16) during operation of the throttle-valve assembly (10), the spherical-cap section (68) has a central point (80) which, starting from the axis of rotation (19) of the throttle-valve shaft (18) downstream along the main flow direction (60) of the gaseous medium (62), is displaced by a distance $H_2$, with the spherical-cap section (68) having a radius $R_K$ which is approximately determined by the following equation:

$$R_K = [R_Z^2 + (H_1 - H_2)^2]^K.$$

10 Claims, 4 Drawing Sheets

THROTTLE-VALVE ASSEMBLY

FIELD AND BACKGROUND OF THE INVENTION

The invention relates to a throttle-valve assembly having a housing, which has a continuous throttle opening through which a gaseous medium can flow in a main flow direction, in which a throttle valve fastened pivotably on a throttle-valve shaft is arranged in the throttle opening, in which the throttle-valve shaft can be pivoted by an actuator arranged in the housing, in which, starting from the axis of rotation of the throttle-valve shaft downstream along the main flow direction of the gaseous medium, the throttle opening has an approximately straight cylinder section with a height $H_1$ and a radius $R_Z$ and in which a spherical-cap section adjoins the approximately straight cylinder section.

To control the quantity of fresh gas for a motor vehicle, use is generally made of throttle-valve assemblies. Throttle-valve assemblies comprise a housing having a throttle opening and a throttle element arranged in the throttle opening. The throttle element assumes a certain position in the throttle opening to allow through a certain quantity of fresh gas. For this purpose, the throttle element can be activated mechanically or electronically.

Housings of throttle-valve assemblies are generally produced from plastic or metal. Housings of throttle-valve assemblies which are manufactured from metal, for example, aluminum, may have particularly low tolerances. Low tolerances are necessary for a throttle-valve assembly, in the region of the throttle valve, particularly if the intention is for the quantity of flow medium passing through the throttle opening of the throttle-valve assembly to be able to be influenced even by a particularly small movement of the throttle valve. In the closing region of the throttle valve, these requirements are also referred to as leakage-air requirements. However, metal housings of throttle-valve assemblies have the disadvantage that, after the housing has been produced, for example by die-casting, complicated re-machining of the housing is required. For example, re-machining of housings made of aluminum is necessary in order to ensure the functional requirements provided in and on the housing. Functional requirements are, in particular, the flow passage, the holder for the actuator and gear axis spacings. Precise machining of the bearing seats is also usually necessary, since the correct operating play (bearing clearance) is produced only by the press fit on the needle bearing.

Throttle-valve assembly housings manufactured from plastic have a lower weight than throttle-valve assembly housings which are manufactured essentially from metal, in particular aluminum. Furthermore, plastic, as the material, can also be adapted in an especially simple manner to a wide variety of geometric configurations of the housing. Moreover, in the case of plastic housings produced by injection molding, inserts, for example bearings for mounting the throttle-valve shaft, can be placed into the injection mold provided for the housing and encapsulated with plastic.

The throttle opening of a throttle-valve assembly usually has an approximately cylindrical cross section. The approximately cylindrical cross section of the throttle opening has the effect of causing a continuous increase in the quantity of flow medium flowing through over the working range of the throttle valve when the throttle valve is opened. This may prove disadvantageous if the throttle valve and the throttle opening have a particularly large diameter, for example 90 mm or more. This is because, from a certain opening angle of the throttle valve, the mass of flow medium passing through the throttle opening only changes to a particularly small extent per unit of time, in particular at a particularly large diameter of the throttle valve, when the position of the throttle valve changes, which means that a finely graduated control of the power of the motor vehicle is no longer possible from a certain opening angle of the throttle valve.

SUMMARY OF THE INVENTION

The invention is therefore based on the object of specifying a throttle-valve assembly of the type mentioned above, which reliably ensures a finely graduated control of the medium passing through the throttle opening during operation of the throttle-valve assembly, in particular for throttle valves having a particularly large diameter.

According to the invention, this object is achieved by virtue of the fact that the spherical-cap section has a central point which, starting from the axis of rotation of the throttle-valve shaft downstream along the main flow direction of the gaseous medium, is displaced by a distance $H_2$, with the spherical-cap section having a radius $R_K$ which is approximately determined by the following equation:

$$R_K = [R_Z^2 + (H_1 - H_2)^2]^{1/2}.$$

The invention starts from the consideration that a throttle-valve assembly which reliably ensures a finely graduated control of the medium passing through the throttle opening during operation of the throttle-valve assembly, in particular for throttle valves having a particularly large diameter, is to be manufactured with a particularly low outlay on production. The throttle valve is therefore to remain unchanged in its shape and design in order, for cost reasons, to be able to continue installing standard throttle valves in the throttle-valve assembly. Since the housing of a throttle-valve assembly is usually adapted to specific installation requirements, a finely graduated control of the medium passing through the throttle opening during operation of the throttle-valve assembly is to be reliably ensured by means of a special shaping of the throttle opening. In addition to the simple cylinder shape of the throttle opening, a spherical cap can be impressed in a particularly simple manner into the throttle opening of a throttle-valve assembly. The radius of the spherical cap and distance of the central point of the spherical cap from the central point of the throttle-valve shaft are available in this case as parameters for the design of the spherical cap. Extensive considerations and calculations have led to the surprising result that displacement of the central point of the spherical cap relative to the central point of the throttle-valve shaft linked to a requirement for the radius of the spherical cap has the effect of reliably ensuring a sensitive control of the medium passing through the throttle opening even for throttle valves having a particularly large diameter.

Starting from the axis of rotation of the throttle-valve shaft upstream counter to the main flow direction of the gaseous medium, the throttle opening advantageously has an approximately straight cylinder section with a height $G_1$ and a radius $P_Z$, with a spherical cap section adjoining the approximately straight cylinder section, the spherical-cap section having a central point which, starting from the axis of rotation of the throttle-valve shaft upstream along the main flow direction of the gaseous medium, is displaced by a distance $G_2$, with the spherical-cap section having a radius $P_K$ which is approximately determined by the following equation:

$$P_K=[P_Z{}^2+(G_1-G_2)^2]^{1/2}.$$

The characteristic curve along the throttle-valve assembly can additionally be flattened by the fact that the throttle opening has a spherical-cap section both downstream and upstream of the axis of rotation of the throttle-valve shaft, the radius of both spherical caps being spaced apart from the central point of the throttle-valve shaft and the radius of the spherical caps satisfying at least one of the equations stated above.

In an advantageous manner, the value of $R_Z$ is equal to the value of $P_Z$ and the value of $R_K$ is equal to the value of $P_K$. A throttle opening of a throttle-valve assembly, which opening is constructed symmetrically relative to the closed position of the throttle valve, can be produced with particularly little outlay. In this case, the parameters $H_1$, $H_2$ and $R_Z$ can be used to adapt the particular throttle-valve assembly to specific requirements of the particular motor vehicle.

The housing is advantageously produced by injection molding and is predominantly made of plastic, with at least the straight cylinder section in the region of movement of the throttle valve being formed by a metal insert injected into the housing. A metal insert for a plastic housing can be manufactured with smaller tolerances than is possible for a housing made of plastic. Therefore, in order to obtain a predetermined characteristic, a throttle opening which is formed from metal stands out. In order, however, at the same time, to ensure a throttle opening having particularly small tolerances and a particularly low weight of the throttle-valve assembly, only the region of the throttle opening relevant to the characteristic curve is manufactured from metal, the remaining region of the housing being made predominantly or completely of plastic.

The spherical-cap section is advantageously formed by a metal insert integrated in the housing. By this means, an individual spherical-cap shape can be realized with a particularly low outlay for each type of throttle-valve assembly.

Both the cylinder section and the spherical-cap section are advantageously formed by a single-piece metal insert. As a result, sealing problems between the approximately straight cylinder section in the region of movement of the throttle valve and the spherical-cap section do not occur. Moreover, unevennesses in the boundary region between the approximately straight cylinder section in the region of movement of the throttle valve and the spherical-cap section could result in swirling of the gaseous medium passing through the throttle opening during operation of the throttle-valve assembly, which could have a negative effect on the characteristic curve of the throttle valve.

The metal insert is advantageously constructed so as to hold the bearings of the throttle-valve shaft. As a result, the bearings are integrated in the mechanical stability of the metal insert. This arrangement of the bearings enables the throttle-valve shaft to be mounted in a particularly stable manner in the metal insert.

A position detection device is advantageously provided for the throttle-valve shaft, a holder being integrated in the metal insert for the position detection device. In this case, the mechanical stability of the metal insert ensures that the position detection device is particularly securely held in the housing of the throttle-valve assembly. At the same time, the position detection device can additionally be pre-adjusted relative to the throttle-valve shaft via the holder provided in the metal insert, as a result of which the position detection device requires only a particularly small amount of adjustment. In this case, the position detection device can be put into place even at the point at which the metal insert is integrated in the housing.

The actuator is advantageously to be arranged on a base plate, the base plate being constructed as a single piece with the metal insert. By this means, heat arising during operation of the actuator can be conducted away to the metal insert via the base plate, with sufficient cooling of the metal insert being reliably ensured by the gaseous medium passing through the throttle opening.

The advantages obtained with the invention reside, in particular, in the fact that a characteristic curve for a throttle-valve assembly can be obtained by a special shaping of the throttle opening in the region of movement of the throttle valve and not by a change in the shape of the throttle valve and/or arrangement of the throttle-valve shaft, said characteristic curve covering a range which has previously not been achieved with known throttle-valve assemblies. This range of the characteristic curves for a throttle-valve assembly that has been acquired by the invention is advantageous in particular in the case of throttle valves having a particularly large diameter, so that the latter, in spite of their size, reliably ensure a particularly finely graduated control of the power of the internal combustion engine.

BRIEF DESCRIPTION OF THE DRAWINGS

An exemplary embodiment of the invention will be explained in greater detail with reference to a drawing, in which.

Parts corresponding to one another are provided with the same reference numbers in all of the figures.

DETAILED DESCRIPTION OP THE PREFERRED EMBODIMENT

Figure 1:
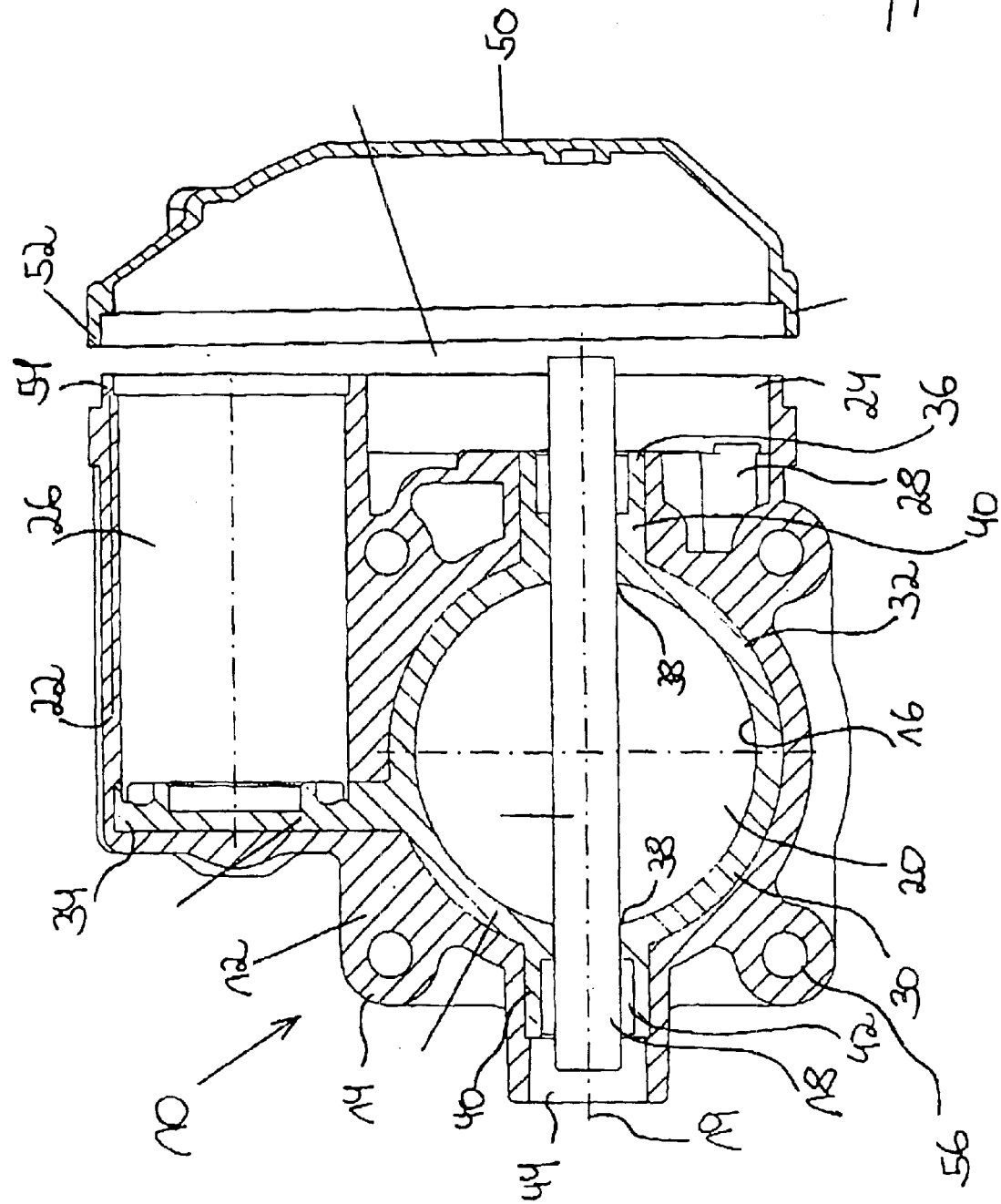
FIG. 1 shows a diagram of a throttle-valve assembly.

The throttle-valve assembly 10 according to FIG. 1 is used to feed air or a fuel/air mixture to a consumer (not illustrated), for example an injection device of a motor vehicle (likewise not illustrated), it being possible to control the quantity of fresh air to be fed to the consumer by means of the throttle-valve assembly 10. For this purpose, the throttle-valve assembly 10 has a housing 12 which is manufactured predominantly from plastic 14 and has been produced by injection molding. As an alternative, however, the housing 12 can also be manufactured entirely from metal, in particular aluminum. The housing 12 has a throttle opening 16 via which the air or a fuel/air mixture can be fed to the consumer (not illustrated). To allow the volume of fresh gas to be fed in to be adjusted, a throttle valve 20 is arranged on a throttle-valve shaft 18. Rotating the throttle-valve shaft 18 about its axis of rotation 19 simultaneously pivots the throttle valve 20 arranged on the throttle-valve shaft 18, as a result of which the active cross section of the throttle opening 16 is enlarged or reduced. The throughput of the air or fuel/air mixture through the throttle opening 16 of the throttle-valve assembly 10 is thus regulated by means of an increase or reduction in the active cross section of the throttle opening 16 by the throttle valve 20.

The throttle-valve shaft 18 can be connected to a cable pulley (not illustrated specifically), which, in turn, is connected by a Bowden cable to an adjusting device for a power demand. In this context, the adjusting device can be constructed as an accelerator pedal of a motor vehicle, actuation of this adjusting device by the driver of the motor vehicle thus enabling the throttle valve 20 to be moved from a position of minimum opening, in particular a closed position, as far as a position of maximum opening, in particular an open position, in order thereby to control the power output of the motor vehicle.

In contrast, it is possible either for the throttle-valve shaft 18 (shown in FIG. 1) of the throttle valve assembly 10 to be adjusted by an actuator over part of the range and otherwise by means of the accelerator pedal or for the throttle valve 10 to be adjusted over the entire range of adjustment by an actuator. In these "electronic engine output control" or "drive-by-wire" systems, mechanical power control, for example depressing an accelerator pedal, is converted into an electric signal. This signal, in turn, is fed to a control unit, which produces an activation signal for the actuator. In these systems, there is no mechanical coupling between the accelerator pedal and the throttle valve 20 in normal operation.

To adjust the throttle-valve shaft 18 and hence the throttle valve 20, the throttle-valve assembly 10 therefore has a drive housing 22 and a gear housing 24. The drive housing 22 and the gear housing 24 are constructed as a single piece with the housing 12 of the throttle-valve assembly 10, but they may also overall form a separate, single-piece constructional unit or else each can be constructed as a single piece by itself.

An actuator 26 constructed as an electric motor is arranged in the drive housing 22. The actuator 26 constructed as an electric motor moves the throttle-valve shaft 18 via a reduction gear arranged in the gear housing 24. The reduction gear is not illustrated specifically in the drawing. The actuator 26 is connected in a manner not illustrated specifically to a power source arranged outside the throttle-valve assembly 10 and to a control unit. The control unit transmits to the actuator a signal, by means of which the actuator 26 brings about a certain position of the throttle-valve shaft 18 via the reduction gear. The actual position of the throttle-valve shaft 18 can be detected via a position detection device 28 which is constructed as a potentiometer and in which the slider of the potentiometer is connected to the throttle-valve shaft 18.

Furthermore, the throttle-valve assembly 10 according to FIG. 1 comprises a metal insert 30 which is manufactured from metal 32 which is in the form of aluminum. The metal insert 30 has been placed into an injection mold provided for the housing 12 of the throttle-valve assembly 10 and has been encapsulated with plastic 14. In this case, the region of the metal insert 30 that forms the throttle opening 16 has not been covered by plastic 14, with the result that, in the region of the throttle opening, the metal 32, which is in the form of aluminum, forms the throttle opening 16.

The metal insert 30 is formed as a single piece with an end shield or base plate 34 on which the actuator 36, which is constructed as an electric motor, is arranged. By this means, heat arising during operation of the actuator 26 can be conducted away to the throttle opening 16 via the metal insert 30. Furthermore, the metal insert 30 has a holder 36 on which the position detection device 28, which is constructed as a potentiometer, for the throttle-valve shaft 18 is arranged. The holder 36, which is constructed as a single piece with the metal insert 30, enables the adjustment of the position detection device 28 constructed as a potentiometer to be particularly simple, since the position of the position detection device 28 relative to the throttle-valve shaft 18 is predetermined by the metal insert 30.

The metal insert 30 has two leadthroughs 38 each having an extension 40. The two extensions 40 are provided for holding bearings 42 for the throttle-valve shaft 18. The housing 12 of the throttle-valve assembly 10 has proven particularly installation-friendly for this, since, after the housing 12 has been constructed, the bearings 42 have simply to be inserted into the extensions 40 provided for this purpose.

On the one side—on the left-hand side according to FIG. 1—the throttle-valve shaft 18 ends in a space 44 in which so-called return springs and/or emergency-running springs can be accommodated, for example. The return springs and/or emergency-running springs preload the throttle-valve shaft in the closing direction, with the result that the actuator 26 acts against the force of the return springs and/or emergency-running springs. A so-called emergency-running spring has the effect of moving the throttle valve 20 into a defined position if the actuator fails, this position generally being above the idling speed. As an alternative or in addition, the throttle-valve shaft 18 can also project out of the housing 12 of the throttle-valve assembly 10 beyond the space 44. It is then possible for a cable pulley (not illustrated in the drawing), for example, to be mounted at the end of the throttle-valve shaft 18 which is connected to an accelerator pedal via a Bowden cable, thus providing a mechanical desired-value input. This mechanical coupling of the throttle-valve shaft 18 with the accelerator pedal (not illustrated specifically in the drawing) can ensure that the throttle-valve assembly 10 operates in emergency situations, for example if the actuator 26 fails. The end of the space 44 that is remote from the end of the extension 14 can be used for holding further elements. Furthermore, further attachments can be arranged on the end face of the extensions 40, said attachments being provided for holding additional elements, such as, for example, web shafts for gear wheels or segment gears belonging to the gear (not shown).

The housing 12 of the throttle-valve assembly 10 can be closed by a housing cover 50. For this purpose, the housing 12 of the throttle-valve assembly 10 has a peripheral flat 52 in the direction of the housing cover 50, said flat corresponding to a peripheral web 54 on the housing cover 50. The flat 52 and the web 54 ensure a well-defined position of the housing cover 50 on the housing 12. After the housing cover 50 is placed onto the housing 12, the two mutually facing faces of the flat 52 and of the web 54 are fused together by a laser beam, thus producing a virtually unreleasable connection. As an alternative, however, the housing cover 50 may also be bonded onto the housing 12. Furthermore, the housing 12 has flange lugs 56 for connection to elements which are arranged outside the throttle-valve assembly 10 and are constructed as a single piece with the housing 12.

Figure 2:
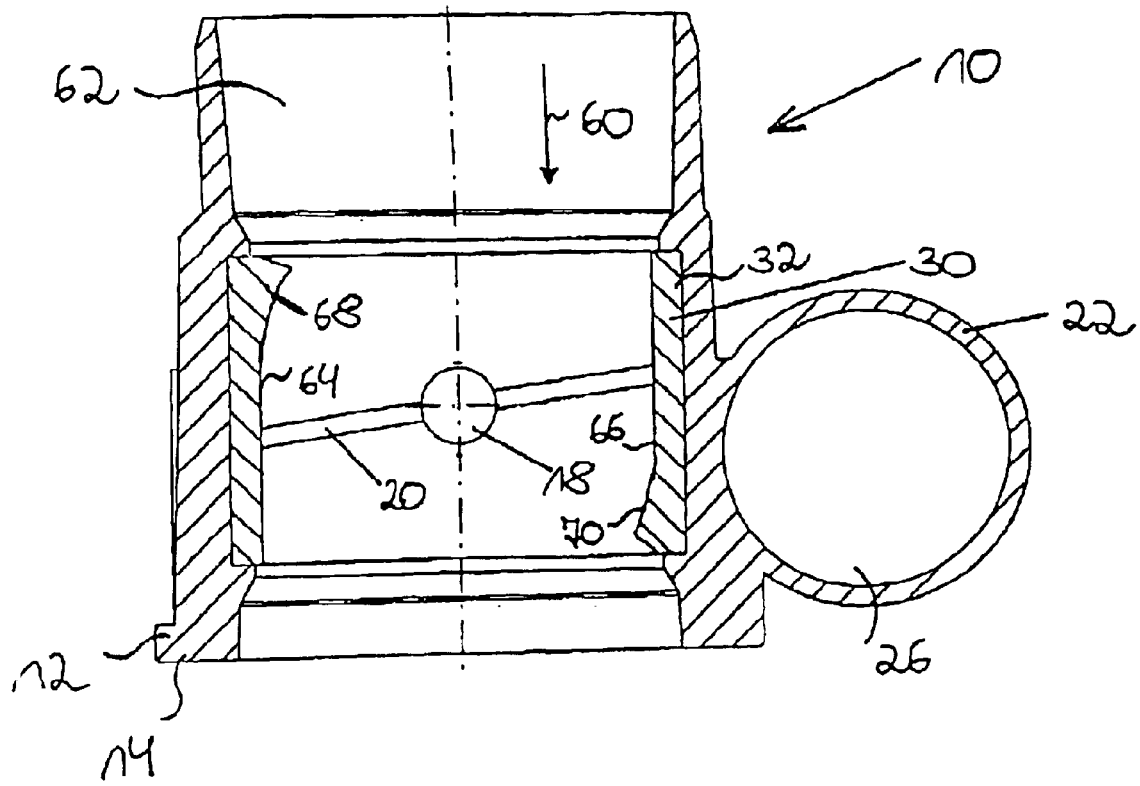
FIG. 2 shows a diagram of a section through the throttle-valve assembly according to FIG. 1.

FIG. 2 shows a diagram in longitudinal section of the throttle-valve assembly 10 according to FIG. 1. According to FIG. 2, the metal insert 30 is manufactured from aluminum. The metal insert 30 forms a subregion of the throttle opening 16 through which a gaseous medium 62 can flow in a main flow direction 60. In the region of the closed position of the throttle valve 20 both downstream and upstream of the main flow direction 60 of the gaseous medium 62, the metal insert 30 in each case comprises a straight cylinder section 64 and 66. The straight cylinder sections 64 and 66 are constructed as a single piece, but may alternatively also be constructed as two pieces. The straight cylinder sections 64 and 66 are adjoined in each case by a spherical-cap section 68 and 70, respectively. The spherical-cap sections 68 and 70 are constructed as a single piece with the straight cylinder sections 64 and 66. Thus, in a single-piece embodiment, the metal insert 30 comprises the two straight cylinder sections 64 and 66 and the two spherical-cap sections 68 and 70. As an alternative, however, the straight cylinder sections 64 and 66 and the spherical-cap sections 68 and 70 can also be constructed in each case as a single piece or can be constructed as a single piece in pairs. The outer circumference of the metal insert 30 and at least part of its end faces are surrounded by the plastic 14 of the housing 12.

Figure 3:
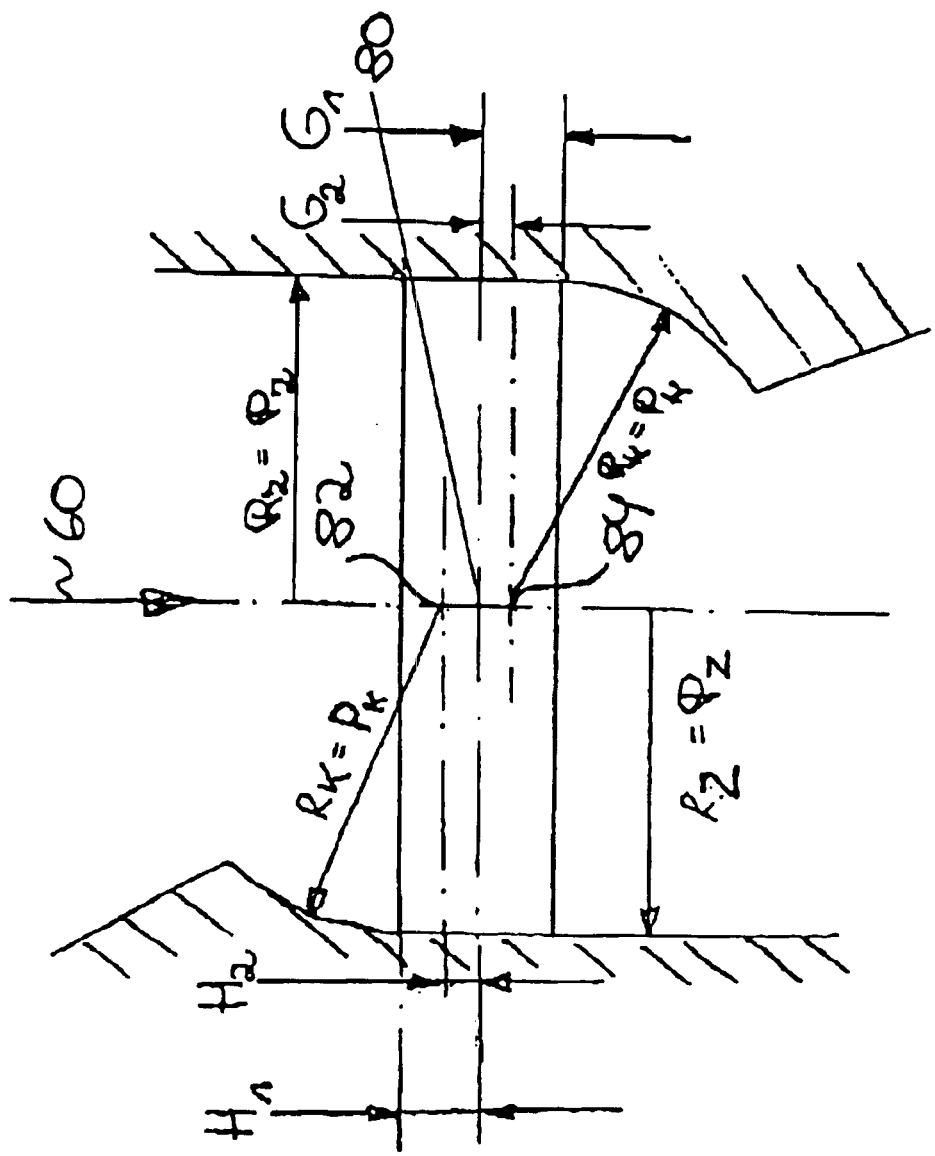
FIG. 3 shows a diagram of a section through the throttle opening in the region of the throttle valve.

FIG. 3 shows the parameters of the metal insert 30 in the region of the throttle-valve shaft 18. Starting from the axis of rotation 19 of the throttle valve shaft 18, the approximately straight cylinder section 64 of the metal insert 30 extends downstream of the main flow direction 60 of the gaseous medium 62 with a height $H_1$. In this region, the metal insert 30 has a radius $R_Z$. The approximately straight cylinder section 64 of the throttle opening 16 with the height $H_1$ is adjoined, starting from the axis of rotation 19 of the throttle-valve shaft 18 upstream counter to the main flow direction 60 of the gaseous medium 62 by a likewise approximately straight cylinder section 66 of the metal insert 30 with a height $G_1$. Downstream along the main flow direction 60 of the gaseous medium 62, the first, approximately straight cylinder section 64 of the metal insert 30 is adjoined by a spherical-cap section 68. The central point 80 of the spherical-cap section 68 does not lie in the imaginary central point 82 of the throttle-valve shaft 18. The central point of the spherical-cap section 68 is displaced from the imaginary central point 82 of the throttle-valve shaft 18 by an amount $H_2$. The spherical-cap section 68 has a radius which satisfies the following equation:

$$R_K = [R_Z^2 + (H_1 - H_2)^2]^{1/2}.$$

Upstream counter to the main flow direction 60 of the gaseous medium 62, the second, approximately straight cylinder section 66 is likewise adjoined by a spherical-cap section 70. The second spherical-cap section 70 also has a central point 84 which is displaced from the imaginary central point 80 of the throttle-valve shaft 18 by an amount $G_2$. The radius of the spherical-cap section 70 is defined by the following equation:

$$P_K = [P_Z^2 + (G_1 - G_2)^2]^{1/2}.$$

In this exemplary embodiment, the value of $R_Z$ is equal to the value of $P_Z$ and the value of $R_K$ is equal to the value of $P_K$. As an alternative, however, the values may also be different or only some of them may be the same.

Figure 4:
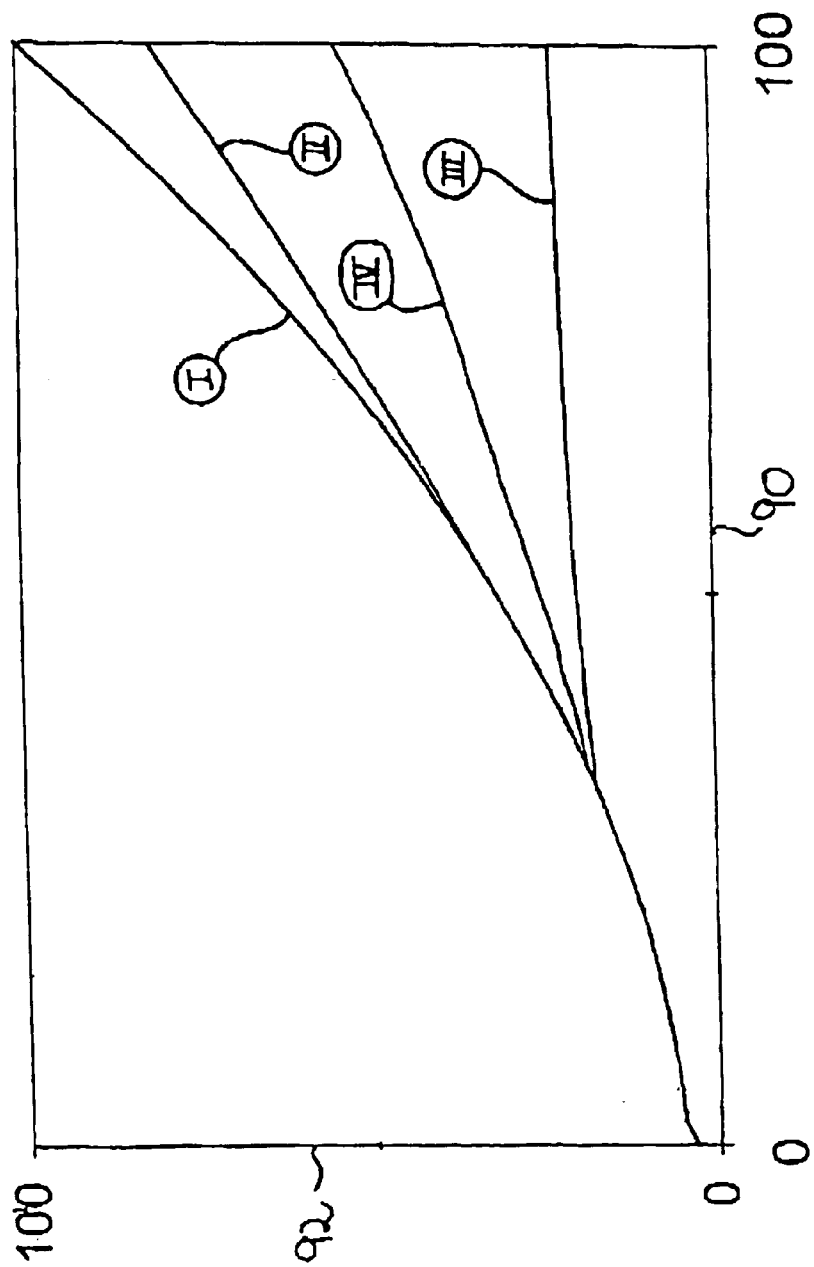
FIG. 4 shows an overview of characteristic curves of various throttle-valve assemblies.

The graph according to FIG. 4 illustrates the effects of the parameters of the metal insert 30 in the region of movement of the throttle-valve shaft. On the graph, the working region 90 of the throttle-valve shaft 18 is indicated on the abscissa in percent (%) and the mass 92 of gaseous medium passing through the throttle opening 16 is indicated on the ordinate in percent (%). The characteristic curve I is characteristic for a throttle-valve assembly which has an approximately cylindrical throttle opening. The characteristic curve II corresponds to a throttle-valve assembly, in which the throttle opening has, both upstream and downstream in the region of the throttle-valve shaft, a cylinder section which is adjoined in each case, i.e. both upstream and downstream, by a spherical-cap section. In this case, the central point of the spherical cap lies on the edge of the respective, cylindrical section in alignment with the imaginary central point of the throttle-valve shaft. The characteristic curve III corresponds to a throttle-valve assembly, in which the throttle opening has, in the region of the throttle-valve shaft, a cylindrical section both upstream and downstream of the main flow direction 60 of the gaseous medium 62. The straight cylinder section is adjoined both upstream and downstream by a respective spherical-cap section. In this case, the spherical-cap section has a central point which coincides with the imaginary central point of the throttle-valve shaft.

In contrast to this, the throttle-valve assembly 10 according to FIGS. 1 to 3 has a metal cap 30 which has, both upstream and downstream of the main flow direction 60 of the gaseous medium 62 starting from the axis of rotation 19 of the throttle-valve shaft 18, a straight cylinder section 64 and 66, respectively. The two straight cylinder sections 64 and 66 are adjoined in each case by the spherical-cap sections 68 and 70. In this case, the radius of the spherical-cap sections 68 and 70 is spaced apart from the imaginary central point of the throttle-valve shaft 18. The radius of the spherical-cap sections 68 and 70 satisfies at least one of the equations stated above. The graph according to FIG. 4 clearly shows that the characteristic curve IV which lies outside the hitherto customary regions of the characteristic curves can be achieved by the throttle-valve assembly 10 according to FIGS. 1 to 3. This reliably ensures a finely graduated control of the gaseous medium 62 passing through the throttle opening 16 even for throttle valves having a particularly large diameter.

I claim:

1. A throttle-valve assembly (10) having a housing (12), which has a continuous throttle opening (16) through which a gaseous medium (62) can flow in a main flow direction (60), the throttle valve assembly further comprising:

a throttle valve (20) fastened pivotably on a throttle-valve shaft (18) and being located in the throttle opening (16); an actuator (26) disposed in the housing (12) for pivoting the throttle-valve shaft (18);

wherein starting from an axis of rotation (19) of the throttle-valve shaft (18) downstream along the main flow direction (60) of the gaseous medium (62), the throttle opening (16) has an approximately straight cylinder section (64) with a height $H_1$ and a radius $R_Z$, and wherein the throttle opening (16) includes a spherical-cap section (68) that adjoins the approximately straight cylinder section (64);

the spherical-cap section (68) has a central point (80) displaced from the axis of rotation (19) of the throttle-valve shaft (18), downstream along the main flow direction (60) of the gaseous medium (62), by a distance $H_2$; and the spherical-cap section (68) has a radius $R_K$ which is approximately determined by the following equation:

$$R_K = [R_Z^2 + (H_1 - H_2)^2]^{1/2}.$$

2. The throttle-valve assembly (10) as claimed in claim 1, wherein;

proceeding from the axis of rotation (19) of the throttle-valve shaft (18) upstream counter to the main flow direction (60) of the gaseous medium (62), the throttle opening (16) has an approximately straight cylinder section (66) with a height $G_1$ and a radius $P_Z$;

the straight cylinder section (64) is a first cylinder section, the spherical cap section (68) is a first cap section, and the throttle valve assembly further comprises a second spherical-cap section (70) which adjoins an approximately straight second cylinder section (66) located opposite the first cylinder section, the second spherical-cap section (70) has a central point (84) which, starting from the axis of rotation (19) of the throttle-valve shaft (18), upstream along the main flow direction (60) of the gaseous medium (62), is displaced by a distance $G_2$ from the axis of rotation (19), with the second spherical-cap section (70) having a radius $P_K$ which is approximately determined by the following equation:

$$P_K = [P_Z^2 + (G_1 - G_2)^2]^{1/2}.$$

3. The throttle-valve assembly (10) as claimed in claim 1, wherein the value of $R_Z$ is equal to the value of $P_Z$ and the value of $R_K$ is equal to the value of $P_K$.

4. The throttle-valve assembly (10) as claimed in claim 2, wherein the housing (12) is produced by injection molding and is predominantly made of plastic (14), with at least either of the first and the second straight cylinder section (64, 66) being formed by a metal insert (30) integrated in the housing (12).

5. The throttle-valve assembly (10) as claimed in claim 2, wherein either of the first and the second spherical-cap sections (68, 70) is formed by a metal insert (30) integrated in the housing (12).

6. The throttle-valve assembly (10) as claimed in claim 5, wherein either of the first and the second straight cylinder sections (64, 66) and either of the first and the second spherical-cap sections (68, 70) are formed by a single-piece metal insert (30).

7. The throttle-valve assembly (10) as claimed in claim 4, wherein the metal insert (30) is constructed so as to hold bearings (42) of the throttle-valve shaft (18).

8. The throttle-valve assembly (10) as claimed in claim 4, wherein the throttle-valve shaft (18) further comprises a position detection device (28) held in a holder (36) in the metal insert (30).

9. The throttle-valve assembly (10) as claimed in claim 4, wherein the actuator (26) is arranged on a base plate (34), the base plate (34) being constructed as a single piece with the metal insert (30).

10. The throttle-valve assembly (11) as claimed in claim 2, wherein the value of $R_Z$ is equal to the value of $P_Z$ and the value of $R_K$ is equal to the value of $P_K$.

* * * * *